United States Patent
Yamada

(10) Patent No.: US 9,062,957 B2
(45) Date of Patent: Jun. 23, 2015

(54) MULTI-WAVELENGTH INTERFEROMETER, MEASUREMENT APPARATUS, AND MEASUREMENT METHOD

(71) Applicant: Canon Kabushiki Kaisha, Tokyo (JP)

(72) Inventor: Akihiro Yamada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 13/657,631

(22) Filed: Oct. 22, 2012

(65) Prior Publication Data

US 2013/0100458 A1    Apr. 25, 2013

(30) Foreign Application Priority Data

Oct. 24, 2011    (JP) .................................. 2011-233345

(51) Int. Cl.
   *G01B 9/02*    (2006.01)

(52) U.S. Cl.
   CPC .......... *G01B 9/02007* (2013.01); *G01B 9/0207* (2013.01); *G01B 9/02002* (2013.01); *G01B 9/02082* (2013.01); *G01B 9/02067* (2013.01); *G01B 9/02061* (2013.01); *G01B 2290/70* (2013.01); *G01B 2290/50* (2013.01); *G01B 2290/45* (2013.01)

(58) Field of Classification Search
   CPC .......... G01B 9/02002; G01B 9/02007; G01B 9/02061; G01B 9/02067; G01B 9/0207; G01B 9/02082; G01B 2290/45; G01B 2290/50; G01B 2290/70
   USPC .......................... 356/486, 487, 489, 493, 495
   See application file for complete search history.

(56) References Cited

U.S. PATENT DOCUMENTS

| | | | | |
|---|---|---|---|---|
| 5,106,191 | A | * | 4/1992 | Ohtsuka ........................ 356/487 |
| 5,493,395 | A | * | 2/1996 | Otsuka ........................... 356/487 |
| 5,811,826 | A | | 9/1998 | Shirley |

(Continued)

FOREIGN PATENT DOCUMENTS

| | | |
|---|---|---|
| CN | 101087990 A | 12/2007 |
| JP | 5071918 A | 3/1993 |
| JP | 10185529 A | 7/1998 |
| WO | 2011073126 A1 | 6/2011 |

OTHER PUBLICATIONS

Fercher et al., "Rough-surface interferometry with a two-wavelength heterodyne speckle interferometer", Applied Optics, 1985, vol. 24, issue14, pp. 2181-2188.

(Continued)

*Primary Examiner* — Michael A Lyons
(74) *Attorney, Agent, or Firm* — Canon USA Inc. IP Division

(57) ABSTRACT

A multi-wavelength interferometer includes a beam splitter configured to split plural light fluxes into a reference beam and a measurement beam, a frequency shifter configured to shift a frequency of at least one of the reference beam and the measurement beam to make the frequencies of the reference beam and the measurement beam different from each other, an optical system configured to cause the measurement beam to be incident on a measurement surface and to cause the measurement beam reflected from the measurement surface to interfere with the reference beam to obtain interference light, a dividing unit configured to divide the interference light into a plurality of light beams, and a detection unit configured to detect the plurality of light beams divided by the dividing unit.

6 Claims, 8 Drawing Sheets

(56) References Cited

U.S. PATENT DOCUMENTS

| | | | |
|---|---|---|---|
| 5,991,034 A | | 11/1999 | Ohtsuka |
| 6,018,391 A | * | 1/2000 | Yoshida .................. 356/484 |
| 6,407,816 B1 | | 6/2002 | De Groot et al. |
| 7,006,562 B2 | * | 2/2006 | Chou ........................ 375/226 |

OTHER PUBLICATIONS

Vry et al., "Higher-order statistical properties of speckle fields and their application to rough-surface interferometry", J. Opt.Soc.Am.A, Jul. 1986, vol. 3, issue 7, pp. 988-1000.

* cited by examiner

MULTI-WAVELENGTH INTERFEROMETER, MEASUREMENT APPARATUS, AND MEASUREMENT METHOD

BACKGROUND OF THE INVENTION

1. Field of the Invention

The present invention relates to a multi-wavelength interferometer, a measurement apparatus, and a measurement method.

2. Description of the Related Art

A heterodyne interferometric method has been generally known as an apparatus for accurately measuring the shape of a measurement surface. In a single-wavelength interferometer (refer to Japanese Patent Application Laid-Open No. 10-185529), if a measurement surface is rough, a speckle pattern resulting from surface roughness has a random phase with a standard deviation larger than $2\pi$ to increase inaccuracy in measurement, making it difficult to perform an accurate measurement.

Japanese Patent Application Laid-Open No. 05-71918 discusses a method for solving the above problem, in which, in an apparatus for irradiating an object surface with a laser beam to image reflected light, the position of a diaphragm of an imaging lens is varied to incoherently average a random phase of a speckle pattern.

As another solving method, a multi-wavelength interferometer has been known in which the phases of wavelengths are combined based on the result of interference measurement on a plurality of different wavelengths (refer to Document 1: A. F. Fercher, et al. "Rough-surface interferometry with a two-wavelength heterodyne speckle interferometer," Applied Optics, 1985, vol. 24, issue 14, pp 2181-2188). According to Document 1, if the speckles of two wavelengths are correlative with each other, information is acquired about a macroscopic surface profile and a microscopic surface roughness based on a difference in phase between the two wavelengths.

It has been known that the correlation of a speckle pattern between the two wavelengths depends on a wavelength in which the two wavelengths are combined (refer to Document 2: U. Vry and F. Fercher, "High-order statistical properties of speckle fields and their application to rough-surface interferometry," J. Opt. Soc. Am. A, 1986, vol. 3, issue 7, pp 988-1000). It is assumed that the more coincident the two speckle patterns, the higher the degree of correlation. According to Document 2, the smaller a composite wavelength $\Lambda$, the less the correlation of the speckle pattern between the two wavelengths. On the other hand, the greater the composite wavelength $\Lambda$, the more the correlation of the speckle pattern between the two wavelengths. The term "composite wavelength $\Lambda$" refers to a quantity represented by $\Lambda=\lambda 1 \times \lambda 2/(\lambda 1-\lambda 2)$, where the two wavelengths are $\lambda 1$ and $\lambda 2$ ($\lambda 1 > \lambda 2$). Thus, the multi-wavelength interferometer is capable of accurately measuring a rough measurement surface, which is difficult for the single-wavelength interferometer to measure.

According to Document 2, the correlation of the speckle pattern between the two wavelengths depends on the magnitude of the composite wavelength, the roughness of the measurement surface, and the inclination of the measurement surface (refer to numerical expression (1)).

$$\mu = \exp\left(\frac{4\pi i}{\Lambda}h_0\right) \times \exp\left[-\frac{4\pi^2}{\Lambda^2}(2\sigma_h^2 + s^2 a^2)\right] \quad (1)$$

where, "$\mu$" represents a complex correlation between two wavelengths, "$h_0$" represents the height of the measurement surface, and "$\Lambda$" represents the composite wavelength of two wavelengths. "$\sigma_h$" represents the roughness of the measurement surface, "s" represents the inclination of the measurement surface, and "a" represents diameter in irradiating the measurement surface with Gaussian beam.

According to numerical expression (1), the greater the roughness of the measurement surface, the lower the correlation of the speckle between the two wavelengths. The greater the inclination of the measurement surface, the lower the correlation of the speckle between the two wavelengths. In particular, the inclination of the measurement surface greatly affects a reduction in the correlation of the speckle between the two wavelengths.

FIG. 1 illustrates a relationship between the inclination angle of the measurement surface and a length measurement error. FIG. 1 indicates the result of simulation of the length measurement error in a case where the measurement surface with a roughness Ra of 0.4 µm is illuminated with beam of 65 µm spot size and measurement is performed by a two-wavelength interferometer with a composite wavelength of 300 µm which receives light in a range of a numerical aperture (NA) of 0.02. The term "length measurement error" refers to a value of $2\sigma$ of length measurement of 100 samples of the measurement surfaces.

According to FIG. 1, at the inclination angle of the measurement surface of 0°, the length measurement error is as small as 0.6 µm. However, at the inclination angle of the measurement surface of 10°, the length measurement error is significantly deteriorated, as poor as 8.1 µm.

In general, the speckle pattern on the pupil conjugate plane of the measurement surface (a plane relative to Fourier transform) in a case where a rough measurement surface inclines is formed as such a pattern that a speckle pattern in a case where a measurement surface does not incline is shifted (lateral shift) in a pupil surface. If the rough measurement surface inclines, a difference occurs in shift amount of the speckle pattern in the pupil surface between different wavelengths $\lambda 1$ and $\lambda 2$ formed on the pupil conjugate plane of the measurement surface, so that the correlation of the speckle pattern between two wavelengths decreases to deteriorate the accuracy of length measurement. The greater the inclination angle of the measurement surface, the larger the difference in shift amount of the speckle pattern in the pupil surface between the wavelengths, so that the correlation of the speckle pattern between two wavelengths is further decreased to cause significant deterioration of a length measurement accuracy. Thus, even though a multi-wavelength interferometer is applied to measure a rough surface, the inclination of the measurement surface decreases a correlation between wavelengths, which makes accurate measurement difficult.

SUMMARY OF THE INVENTION

The present invention is directed to a multi-wavelength interferometer which does not deteriorate measurement accuracy even if a measurement surface is inclined.

According to an aspect of the present invention, a multi-wavelength interferometer using at least two light fluxes each having a different wavelength includes, a beam splitter configured to split the light fluxes into a reference beam and a measurement beam, a frequency shifter configured to shift a frequency of the reference beam or a frequency of the measurement beam or to shift the frequencies of the reference beam and the measurement beam to make the frequencies of the reference beam and the measurement beam different from each other, an optical system configured to cause the measurement beam to be incident on a measurement surface and to cause the measurement beam reflected from the measurement surface to interfere with the reference beam to obtain interference light, a dividing unit configured to divide the interference light into a plurality of light beams, and a detection unit configured to detect the plurality of light beams divided by the dividing unit for each wavelength.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
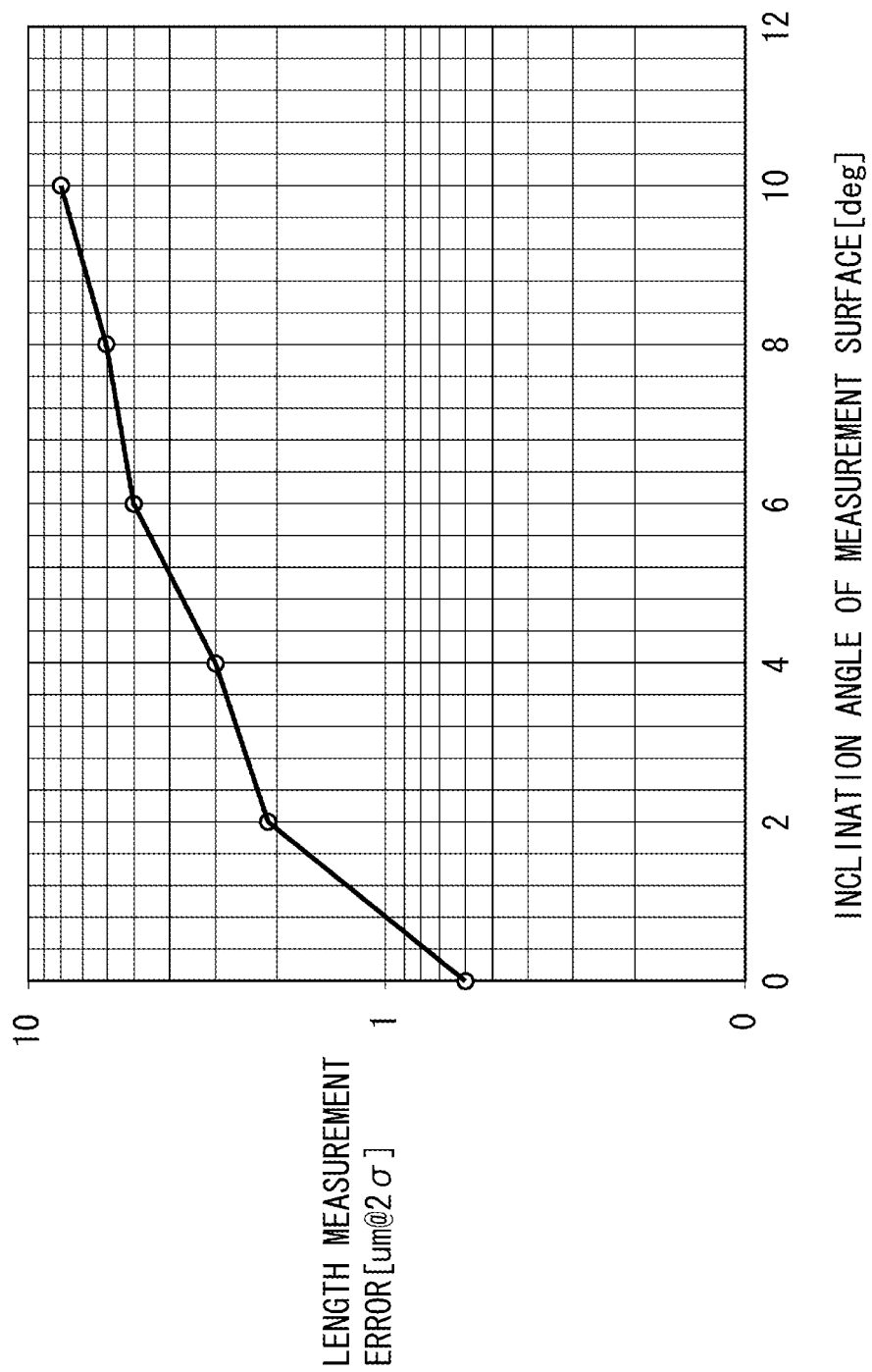
FIG. 1 illustrates a relationship between the inclination angle of a measurement surface and a length measurement error.
Figure 2:
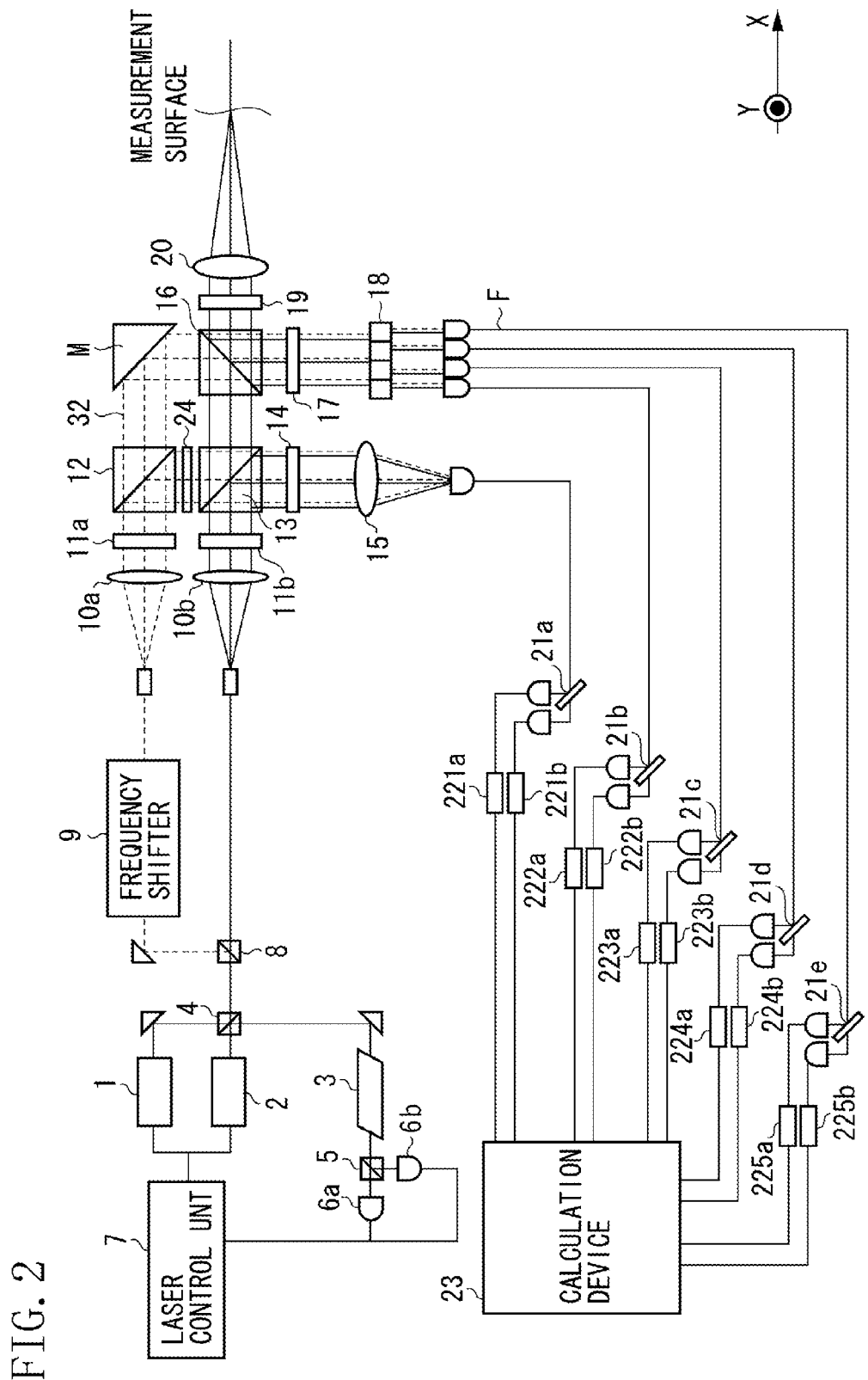
FIG. 2 is a schematic diagram of a measurement apparatus according to first and second exemplary embodiments.

FIG. 2 is a schematic diagram of a measurement apparatus according to a first exemplary embodiment. As illustrated in FIG. 2, the measurement apparatus according to the present exemplary embodiment includes a plurality of fixed-wavelength lasers, an interferometer (an optical system) for causing a measurement beam and a reference beam to interfere with each other, and a calculation device (processing unit).

Light emitted from a fixed-wavelength laser 1 is split by a beam splitter 4 (amplitude splitting). A fixed-wavelength laser 2 emits light different in wavelength from the light emitted from the fixed-wavelength laser 1. Light emitted from the fixed-wavelength laser 2 is also incident on the beam splitter 4, in which its optical axis is made coaxial with that of the light emitted from the fixed-wavelength laser 1, and is split by the beam splitter 4 (amplitude splitting). The fixed-wavelength lasers 1 and 2 use a similar distributed-feedback (DFB) semiconductor laser. In the present exemplary embodiment, the fixed-wavelength lasers 1 and 2 are shown as separate devices. However, a plurality of semiconductor lasers may be integrated into a single device as is the case with a multi-wavelength light source used in optical communication. The above integrated structure is advantageous in terms of reducing the cost and overall size of the apparatus. A helium-neon (He—Ne) laser may be used instead of the DFB laser.

The light split by the beam splitter 4 passes through a gas cell 3, being a reference device of wavelength, and is separated into the light emitted from the fixed-wavelength laser 1 and the light emitted from the fixed-wavelength laser 2 by a spectral element 5 (optical filter or beam splitter). For the amount of light passing through the gas cell 3, the light emitted from the fixed-wavelength lasers 1 and 2 is detected by detectors 6a and 6b, respectively.

A laser control unit 7 is operatively connected to the fixed-wavelength lasers 1 and 2, and to the detectors 6a and 6b. The control unit 7 performs control so that the wavelength of the fixed-wavelength laser 1 is stabilized to a wavelength $\lambda 1$, being the absorption line of the gas cell, using the signal of the detector 6a. The wavelength is stabilized by the laser control unit 7 adjusting the wavelength of the fixed-wavelength laser 1 so that the transmission strength of the detector 6a, for example, becomes constant. The wavelength is adjusted by modulating inrush current or regulating heat, for example. Similarly, the laser control unit 7 performs control so that the wavelength of the fixed-wavelength laser 2 is stabilized to a wavelength $\lambda 2$, being the absorption line of the gas cell, using the signal of the detector 6b. In the present exemplary embodiment, the accuracy of the wavelength is assured using only the gas cell. However, an etalon may be used instead of the gas cell. Alternatively, both the gas cell and the etalon may be used.

The other light split by the beam splitter 4 is split into a reference beam (a first light flux) and a measurement beam (a second light flux) by a polarizing beam splitter 8. The first light flux is incident on a frequency (wavelength) shifter 9. The frequency shifter 9 applies a certain amount of frequency shift to the frequency of the incident light output from the fixed-wavelength lasers 1 and 2 by an acousto-optic device. The light output from the frequency shifter 9 is incident on a collimation lens 10a. The second light flux split by the polarizing beam splitter 8 is incident on a collimation lens 10b. The frequency shifter 9 may be arranged in the optical path of the second light flux, or frequency shifters different in the amount of shift from each other may be arranged in both light fluxes.

Figure 3:
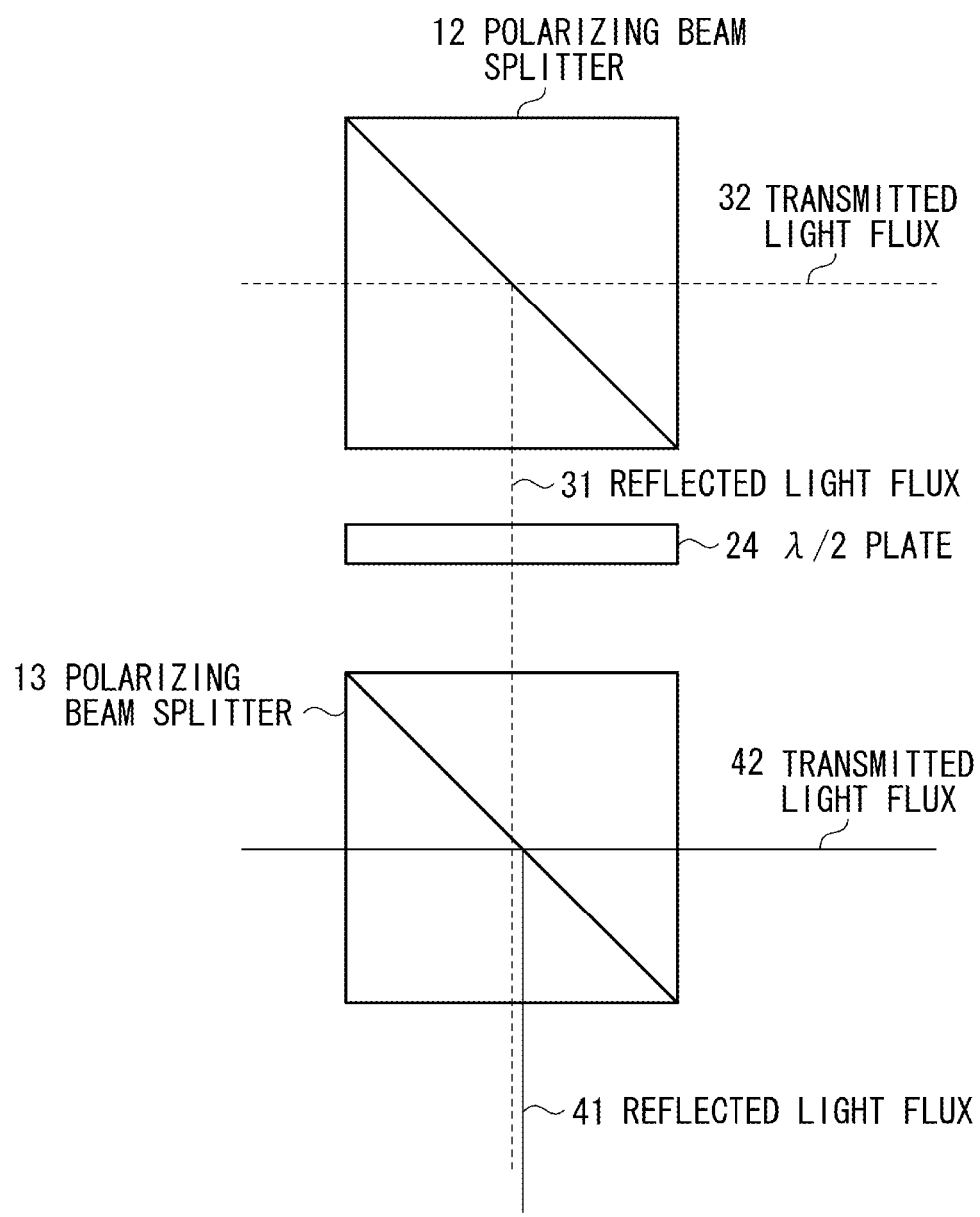
FIG. 3 is a schematic diagram illustrating that a light flux is split by a polarizing beam splitter.

The first light flux incident on the collimation lens 10a is collimated by the collimation lens 10a and passes through a $\lambda/2$ plate 11a, and is then split into a reflected light flux 31 and a transmitted light flux 32 by a polarizing beam splitter 12 as illustrated in FIG. 3. The reflected light flux 31 split by the polarizing beam splitter 12 passes through a $\lambda/2$ plate 24, whereby the polarization of the reflected light flux 31 is rotated by 90 degrees. The reflected light flux 31 passes through a polarizing beam splitter 13 and a polarizer 14, is collected by a collection lens 15, and then incident on a spectral element 21a.

The second light flux incident on the collimation lens 10b is collimated by the collimation lens 10b and passes through a $\lambda/2$ plate 11b, and is then split into a reflected light flux 41 and a transmitted light flux 42 by the polarizing beam splitter 13 as illustrated in FIG. 3. The reflected light flux 41 split by the polarizing beam splitter 13 passes through the polarizer 14, is collected by the collection lens 15, and then incident on the spectral element 21a. Rotation direction with respect to the optical axis of the $\lambda/2$ plate 11a is set so that a ratio of light quantity between the reflected light flux 31 and the transmitted light flux 32 becomes equal to a predetermined ratio. Similarly, rotation direction with respect to the optical axis of the $\lambda/2$ plate 11b is set so that a ratio of light quantity between the reflected light flux 41 and the transmitted light flux 42 becomes equal to a predetermined ratio. At this point, the reflected light flux 31 is desirably comparable in light quantity to the transmitted light flux 32 to maximize the contrast of an interference signal between the reflected light flux 31 and the reflected light flux 41.

The spectral element 21a separates coaxially incident light from the fixed-wavelength lasers 1 and 2. A detector 221a detects interference light between the reflected light flux 31 in which frequency shift is applied to light with a wavelength $\lambda 1$ and the reflected light flux 41 with the wavelength $\lambda 1$, and a beat signal (an interference signal) corresponding to a difference in frequency between both light fluxes is output (acquired) from the detector 221a. A detector 221b detects interference light between the reflected light flux 31 in which frequency shift is applied to light with a wavelength $\lambda 2$ and the reflected light flux 41 with the wavelength $\lambda 2$, and a beat signal (an interference signal) corresponding to a difference in frequency between both light fluxes is output (acquired) from the detector 221b. The polarizer 14 is set so that the common polarized component of the reflected light fluxes 31 and 41 is extracted to detect interference light by the detector. Hereinafter, an interference signal acquired by the detectors 221a and 221b (detection units) via the spectral element 21a is referred to as a "reference signal".

The transmitted light flux 32 (reference beam) split by the polarizing beam splitter 12 is deflected by a mirror M and is then incident on a polarizing beam splitter 16. The transmitted light flux 42 (measurement beam) split by the polarizing beam splitter 13 passes through the polarizing beam splitter 16, is then circularly polarized by a $\lambda/4$ plate 19, converged by a collection lens 20, and concentrated (focused) on the measurement surface. The transmitted light flux 42 is reflected by the measurement surface, reversely rotated and circularly polarized, and passes through the $\lambda/4$ plate 19 again, so that the transmitted light flux 42 is linearly polarized with a polarized wave surface rotated by 90 degrees with respect to the polarized wave surface in which the transmitted light flux 42 is previously incident on the polarizing beam splitter 16, and is then incident again on the polarizing beam splitter 16. Then, the transmitted light flux 42 is reflected by the polarizing beam splitter 16. The polarizing beam splitter 16 combines the transmitted light flux 32 (reference beam) incident on the polarizing beam splitter 16 with the transmitted light flux 42 (measurement beam) reflected by the polarizing beam splitter 16 to cause the transmitted light flux 32 and the transmitted light flux 42 to interfere with each other. The interference light between the reference beam and the measurement beam passes through a polarizer 17 and is then incident on a microlens array 18 (dividing unit), which is located on a pupil conjugate plane with respect to the measurement surface (a plane relative to Fourier transform).

The interference light passing through the microlens array 18 is subjected to wavefront splitting into a plurality of light fluxes (pixels). In FIG. 2, for the sake of simplicity of description, an example is illustrated in which the light flux is split into four pixels each having $\phi=1$ mm in one-dimensional direction (x direction) by the microlens array 18 with four lenses arranged in one-dimensional direction (x direction). In a case where the light flux is split by pixels arranged only in the one-dimensional direction, an effect can be obtained only in a case where the measurement surface is inclined to a specific direction corresponding to the one-dimensional direction. For this reason, in practice, the light flux needs to be split into pixels of a two-dimensional matrix to cope with the inclination of the measurement surface in any direction. The light flux split by the microlens array 18 is made separately incident on spectral elements 21b, 21c, 21d, and 21e by optical fibers F. The number of the fibers used may be plural, or a bundle fiber may be used.

It is desirable that the reference beam passing through the polarizing beam splitter 16 is equal in strength to the measurement beam reflected by the measurement surface and the polarizing beam splitter 16 to obtain an interference signal with a high contrast in the detector. For this reason, the polarizer 17 may be rotated to adjust the strength by a rotation mechanism (not illustrated). Alternatively, the strength of the reference light flux or the measurement light flux may be adjusted by a neutral density (ND) filter (not illustrated).

The light which is incident on spectral elements 21b to 21e and which is also the interference light between the reference beam in which a frequency shift is applied to light with a wavelength $\lambda 1$ and the measurement beam with the wavelength $\lambda 1$ is detected by detectors 222a to 225a. The light which is incident on the spectral elements 21b to 21e and which is also the interference light between the reference beam in which a frequency shift is applied to light with a wavelength $\lambda 2$ and the measurement beam with the wavelength $\lambda 2$ is detected by detectors 222b to 225b.

The signal of the interference light (interference signal) detected by the detectors 222a to 225a and the detectors 222b to 225b (detection units) via the spectral elements 21b to 21e is referred to as a "measurement signal". The measurement signal is similar to the reference signal in that the interference light between the reflected light fluxes 31 and 32 becomes the beat signal (an interference signal) corresponding to a difference in frequency between both light fluxes, but different in phase from the reference signal. Therefore, a phase with respect to the reference signal may be acquired as the measurement value of phase of the measurement signal. The phase of the measurement signal varies with a difference in optical path length between the measurement beam and the reference beam.

In the present exemplary embodiment, although light is separated into the measurement signal for each wavelength using the spectral elements 21b to 21e, the reference beam with the wavelength $\lambda 1$ and the reference beam with the wavelength $\lambda 2$ may be provided with different frequency shift amounts to subject the interference signal detected by the detector to frequency separation, so that the light may be separated into interference signals for respective wavelengths. In this case, the configuration does not require spectral elements. The two detectors provided for each light flux divided by the microlens array 18 can be reduced to one detector to simplify the configuration of the apparatus.

The use of the polarizing beam splitter capable of splitting light by polarization components is effective in that the reference beam and the measurement beam can be separated from each other by polarization. The use of the above effect allows heterodyne detection between the measurement beam and the reference beam by adding a slight frequency-shift difference between two orthogonal polarizations, thus realizing a high accurate measurement of phase.

Figure 4:
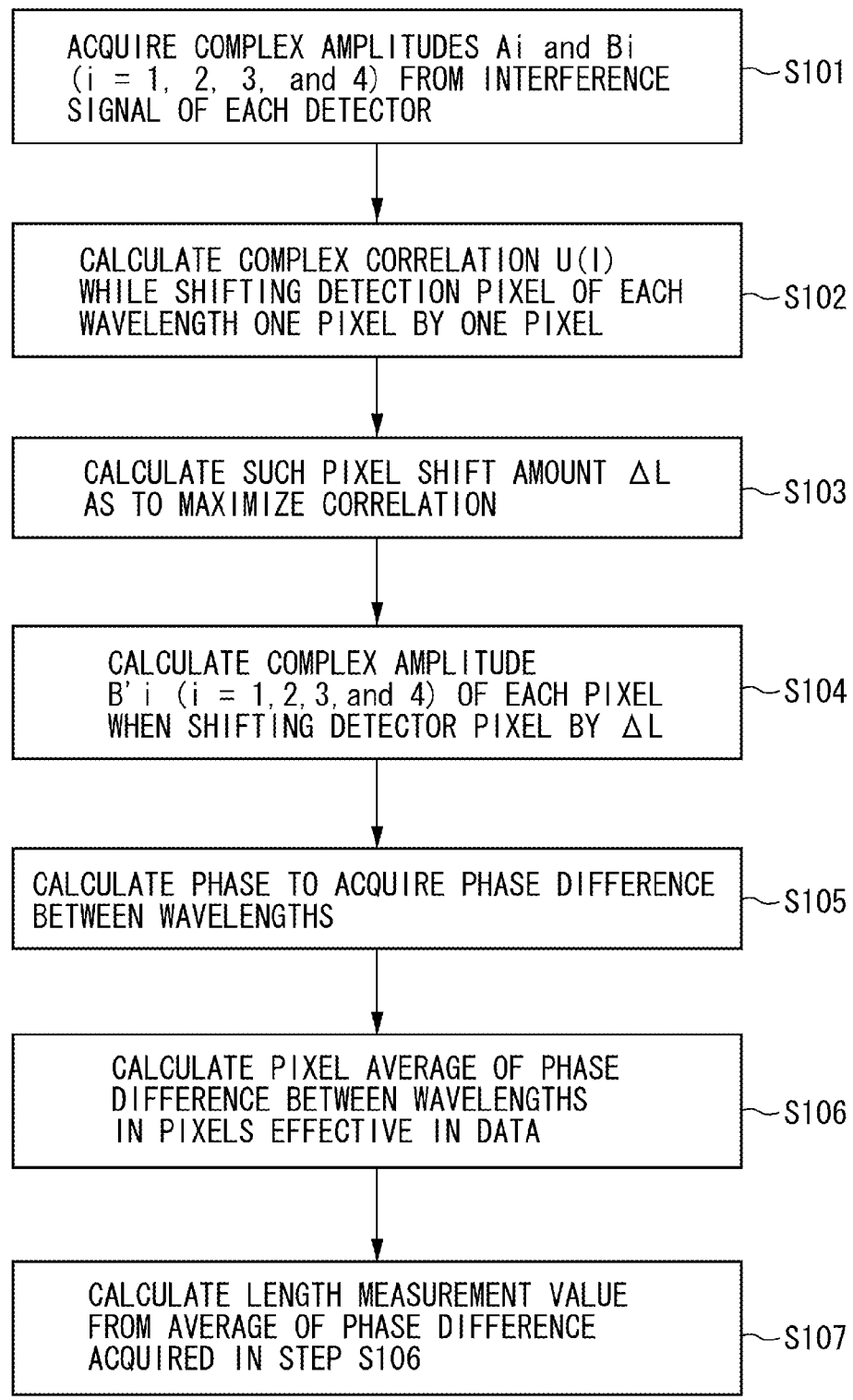
FIG. 4 illustrates a flow chart for calculating a length measurement value according to the first exemplary embodiment.
Figure 5:
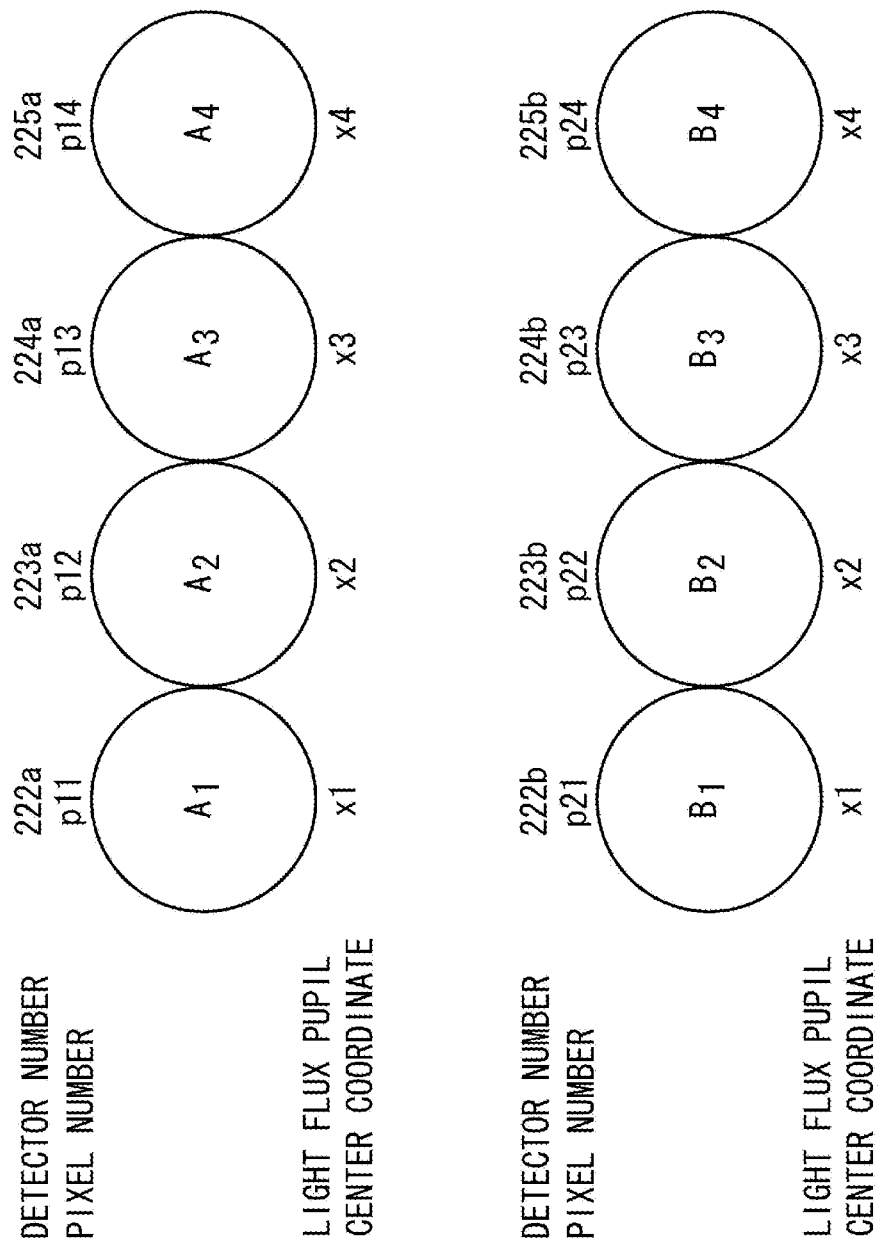
FIG. 5 illustrates a relationship among detectors (pixels), complex amplitudes, and light flux pupil center coordinates.

FIG. 4 illustrates a flow chart for calculating a length measurement value in a calculation device 23 (processing unit). In step S101, the calculation device 23 acquires information (data) about complex amplitude (amplitude and phase) from interference signals detected by the detectors 222a to 225a and the detectors 222b to 225b. For example, as illustrated in FIG. 5, complex amplitudes acquired from interference signals in which light divided at the position of a pupil conjugate plane with respect to the measurement surface is detected by the detectors 222a to 225a are taken as A1, A2, A3, and A4, respectively. Numbers of pupil-plane pixels (lenses) detected by the detectors 222a to 225a are taken as p11, p12, p13, and p14. Similarly, the complex amplitudes acquired from the interference signals in which light flux divided at the position of a pupil conjugate plane with respect to the measurement surface is detected by the detectors 222b to 225b are taken as B1, B2, B3, and B4, respectively. Numbers of pupil-plane pixels (lenses) detected by the detectors 222b to 225b are taken as p21, p22, p23, and p24. The calculation device 23 previously stores information about pixel plane coordinates x1, x2, x3, and x4 at the center of light fluxes (center of each lens) divided by the microlens array 18.

In step S102, the calculation device 23 calculates complex correlation (degree of correlation or correlation coefficient) while shifting the mutual detection pixels of the signals acquired by the detectors 222a to 225a and the detectors 222b to 225b one pixel by one pixel using the complex amplitude data acquired in step S101. Specifically, the calculation device 23 calculates complex correlation U(l) using equation (2).

$$U_+(l) = (\Sigma_{n=1}^{p-1} \mu_{n(n+1)})/(p-1) \ (l=0, 1, \ldots, p-1)$$
$$U_-(l) = (\Sigma_{n=1}^{p+1} \mu_{|n+1||l|})/(p+1) \ (l=-p+1, \ldots -2, -1) \quad (2)$$

where, l represents the pixel shift amount, and p represents the number of divisions made by the microlens array. Equation (3) represents $\mu_{nm}$. A and B are complex amplitudes. n and m are integers.

$$\mu_{nm} = \mathrm{Re}\left\{ \frac{\langle A_n^* B_m \rangle}{(\langle A_n^* B_n \rangle \langle A_m^* B_m \rangle)^{\frac{1}{2}}} \right\} \quad (3)$$

Figure 6:
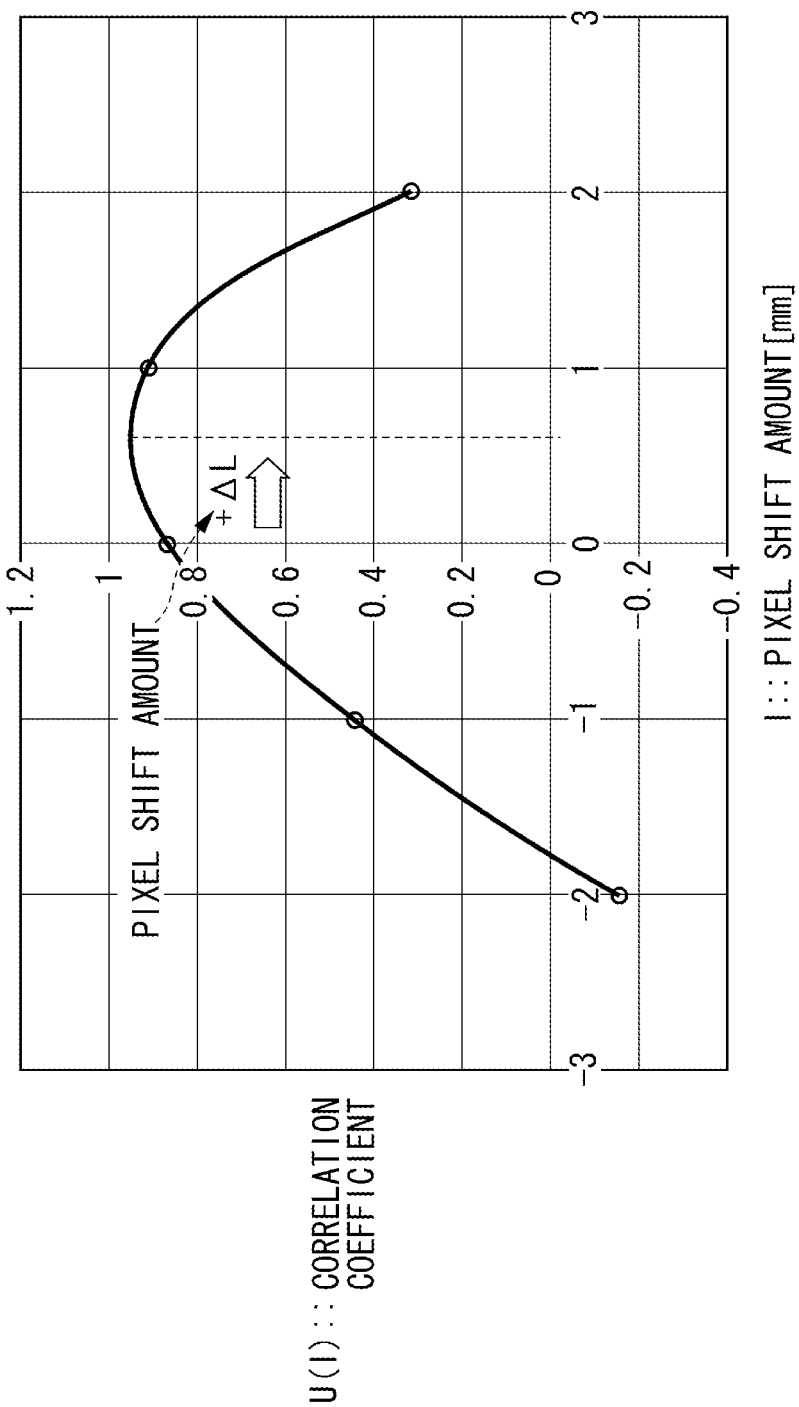
FIG. 6 illustrates a relationship between a pixel shift amount and a complex correlation.

FIG. 6 illustrates an example of a relationship between the pixel shift amount and the complex correlation. In step S103, the calculation device 23 performs function fitting on the complex correlation U(l) in FIG. 6 acquired in step S102 to calculate such a pixel shift amount ΔL as to maximize the complex correlation U(l), from the result of function fitting. A system of functions used in fitting is properly set by measurement conditions. In the present exemplary embodiment, the following description is made, as an example, on the assumption that a quartic function fitting is performed on the complex correlation U(l) to obtain the pixel shift amount ΔL of +0.6 mm, at which the complex correlation is maximized, from the function fitting.

Figure 7:
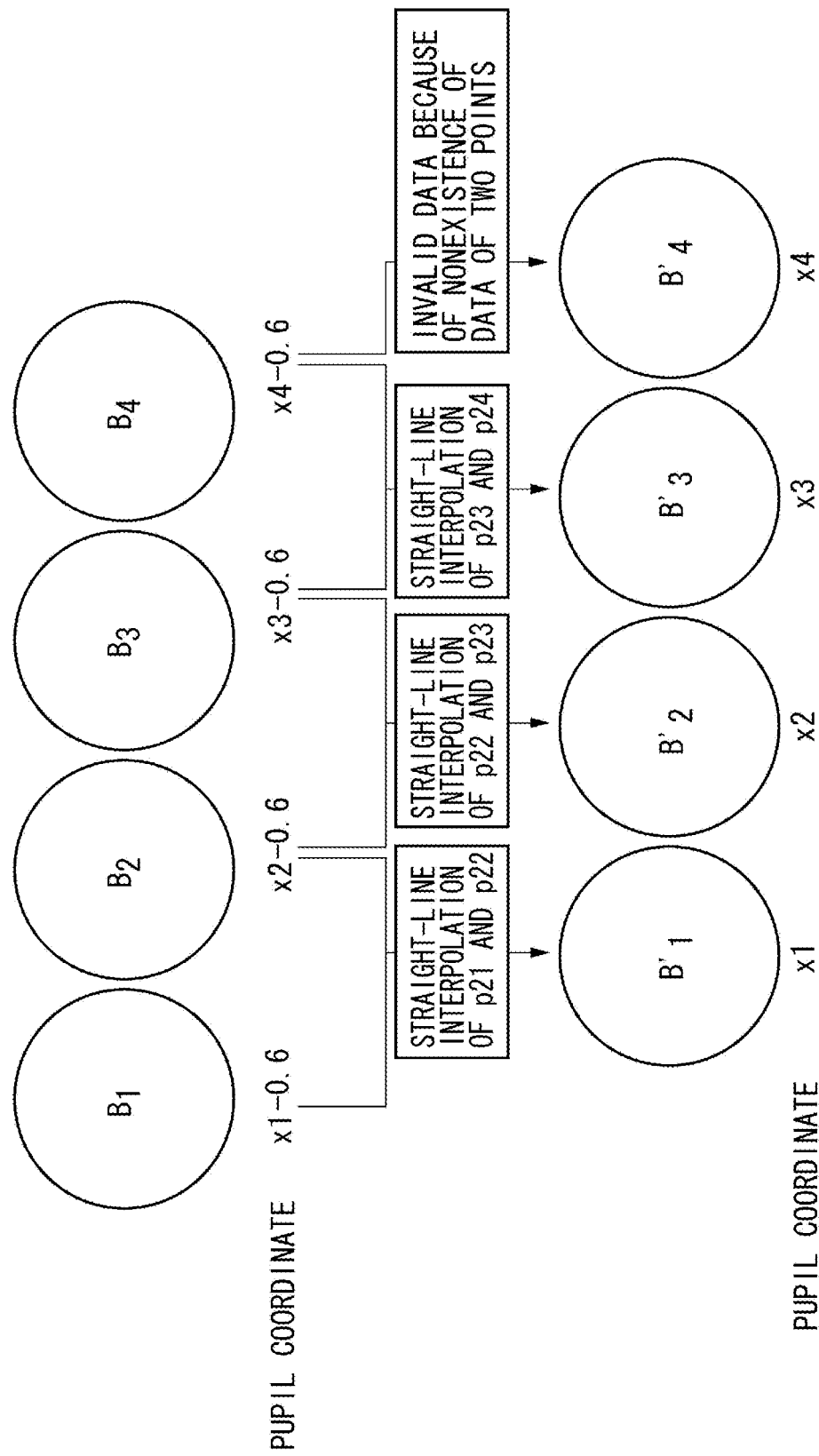
FIG. 7 illustrates the calculation of complex amplitude data at an original detection position from pixel-shifted complex amplitude data.

In step S104, the calculation device 23 calculates complex amplitude at original pixel positions (pupil plane coordinates x1, x2, x3, and x4) when shifting complex amplitude data based on the pixel shift amount ΔL calculated in step S103. In an example illustrated in FIG. 5, the calculation device 23 calculates complex amplitudes B'1, B'2, B'3, and B'4 at the original pixel positions (x1, x2, x3, and x4) using data in which data of complex amplitudes B1, B2, B3, and B4 are shifted by −0.6 mm in the X direction. More specifically, the calculation device 23 separates the complex amplitudes calculated in step S101 into a real part and an imaginary part for each detector. From the linear interpolation data of data of two pints in the neighbor when pixel-shifting the real and imaginary parts, the calculation device 23 obtains data at each point. The calculation device 23 returns information about the real and imaginary parts shifted based on the acquired pixel shift amount to the complex amplitudes and takes the complex amplitudes as B'1, B'2, B'3, and B'4. If there are no data at two points in the neighbor when shifted, the calculation device 23 nullifies the data of the pixel. In this example, as illustrated in FIG. 7, the calculation device 23 acquires the real and imaginary parts of the complex amplitude B'1 at a pupil position x1 from the linear interpolation of two values of data (x1−0.6, B1) in which the complex amplitude B1 is shifted by −0.6 mm in the x direction and data (x2−0.6, B2) in which the complex amplitude B2 is shifted by −0.6 mm in the x direction. Similarly, the calculation device 23 acquires the real and imaginary parts of the complex amplitude B'2 at a pupil position x2 from the linear interpolation of two values of (x2−0.6, B2) and (x3−0.6, B3) and the real and imaginary parts of the complex amplitude B'3 at a pupil position x3 from the linear interpolation of two values of (x3−0.6, B3) and (x4−0.6, B4). For the complex amplitude B'4 at a pupil position x4, the other point of data but (x4−0.6, B4) does not exist, so that the data of the pixel are nullified. Although the complex amplitude data B1, B2, B3, and B4 are shifted by −0.6 mm, the complex amplitude data A1, A2, A3, and A4 may be pixel-shifted by +0.6 mm in the opposite direction. Alternatively, the complex amplitude data A1, A2, A3, and A4 may be pixel-shifted by +0.3 mm and the complex amplitude data B1, B2, B3, and B4 may be shifted by −0.3 mm. In other words, the calculation device 23 shifts a pupil position where the interference signal is detected for each wavelength to correct a difference in speckle shift between wavelengths.

In step S105, the calculation device 23 calculates phases from the complex amplitude data A1, A2, A3, and A4 and the shifted complex amplitude data B1, B2, B3, and B4 to calculate a difference in phase between Ai and B'i (i=1, 2, 3, and 4) (a phase difference between wavelengths λ1 and λ2). At this point, if any one of Ai and B'i is invalid data, the phase difference data are also handled as invalid data. In the specific example, pixel data with numbers p14 and p24 are invalid.

in step S106, the calculation device 23 acquires an average value (pixel average) of a phase difference between wavelengths of effective data excluding invalid data.

In step S107, the calculation device 23 acquires a length measurement value (distance), a difference in optical path length between the reference beam and the measurement beam, or shape, based on data of the average value of a phase difference between wavelengths acquired in step S106 and the value of two wavelengths (composite wavelength). The term "composite wavelength Λ" refers to a quantity represented by Λ=λ1×λ2/(λ1−λ2), where two wavelengths are λ1 and λ2 (λ1>λ2).

The calculation device 23 may acquire the phase of a measurement signal or other physical quantities from the phase based on a difference in optical path length between the reference beam and the measurement beam or the length measurement value (distance). For example, the measurement surface is placed on a stage movable (drivable) in an XY plane to allow the calculation device 23 to be applied to such a shape measurement as to acquire information about surface shape of the measurement surface from the length measurement value. A galvano mirror may be arranged between the interferometer and the measurement surface instead of the movable stage. A known method can be applied to a method for calculating a difference in optical path length, a length measurement value (distance), or shape, from the phase.

Thus, there can be obtained such an effect as to shift (shift in the pupil conjugate plane of the measurement surface) a pupil position where the interference signal is detected for each wavelength only by a calculation process from signals of the interference light of λ1 and λ2 in which light flux is divided by the dividing unit at the fixed pupil position. This allows the correction of a difference in a speckle shift between wavelengths to enable a high speed and accurate measurement.

The method for reducing the influence of speckle by incoherent averaging discussed in Japanese Patent Application Laid-Open No. 05-71918 needs to acquire a large amount of data even if one point is measured and require a processing time for averaging changes in spatial or temporal speckle pattern, so that the measurement time is increased.

As another method for acquiring a similar effect, a traveling unit is added in which the microlens array 18 is made movable and caused to move (drive) to the plane vertical to the optical axis of the interferometer. The interference signal of the wavelength λ1 is acquired and then the microlens array 18 is moved while acquiring the interference signal of the wavelength λ2. A position of the microlens array 18 where a complex correlation between the complex amplitude of the wavelength λ2 and the complex amplitude of the acquired wavelength λ1 is maximized is searched (detected) to allow correcting a difference in speckle shift between wavelengths due to the inclination of the measurement surface. In this configuration, the addition of a mechanism for switching between the light sources 1 and 2 eliminates the need for the spectral elements 21a to 21e. The detectors do not need to be prepared for each wavelength.

Furthermore, as another method, a mechanism may be added in which a diaphragm is arranged in the vicinity of a pupil conjugate plane of the measurement surface, made movable and caused to move (drive) to the plane vertical to the optical axis of the interferometer. The interference signal of the wavelength λ1 is acquired and then the position of the diaphragm (position of diaphragm aperture) is moved while acquiring the interference signal of the wavelength λ2. The position of the diaphragm where a complex correlation is maximized is searched (detected) based on the complex correlation between the complex amplitude of the wavelength λ2 and the complex amplitude of the acquired wavelength λ1 to allow correcting a difference in speckle shift between wavelengths due to the inclination of the measurement surface. In this configuration, a mechanism for the microlens array 18 dividing a light flux at the pupil plane is removed to allow a single detector to detect the interference signal at the position of a pupil conjugate plane of the measurement surface. Also, in this configuration, the addition of the mechanism for switching between the light sources 1 and 2 eliminates the need for the spectral elements 21a to 21e. The detectors do not need to be prepared for each wavelength. The technique discussed in Japanese Patent Application Laid-Open No. 10-185529 merely detects the position of the maximum light quantity corresponding to specular reflection from the measurement surface by moving a diaphragm or a pinhole, and the correlation in speckle between wavelengths is not improved.

In the above description, for the sake of simplicity, the separation of the light flux is made one-dimensional in the vicinity of the position of a pupil conjugate plane of the measurement surface. Actually, as described above, if the measurement surface inclines in any direction, the light flux needs to be separated in a matrix form or two-dimensionally in the vicinity of a pupil conjugate plane of the measurement surface. In this case, the pixel shift also needs to be two-dimensionally processed. The pixel shift is processed by separating the complex amplitude into the real and imaginary parts. However, phase data may be used instead of the complex amplitude. For the phase data, the pixel shift at which the correlation in speckle phase between two wavelengths is maximized is to be corrected.

Figure 8:
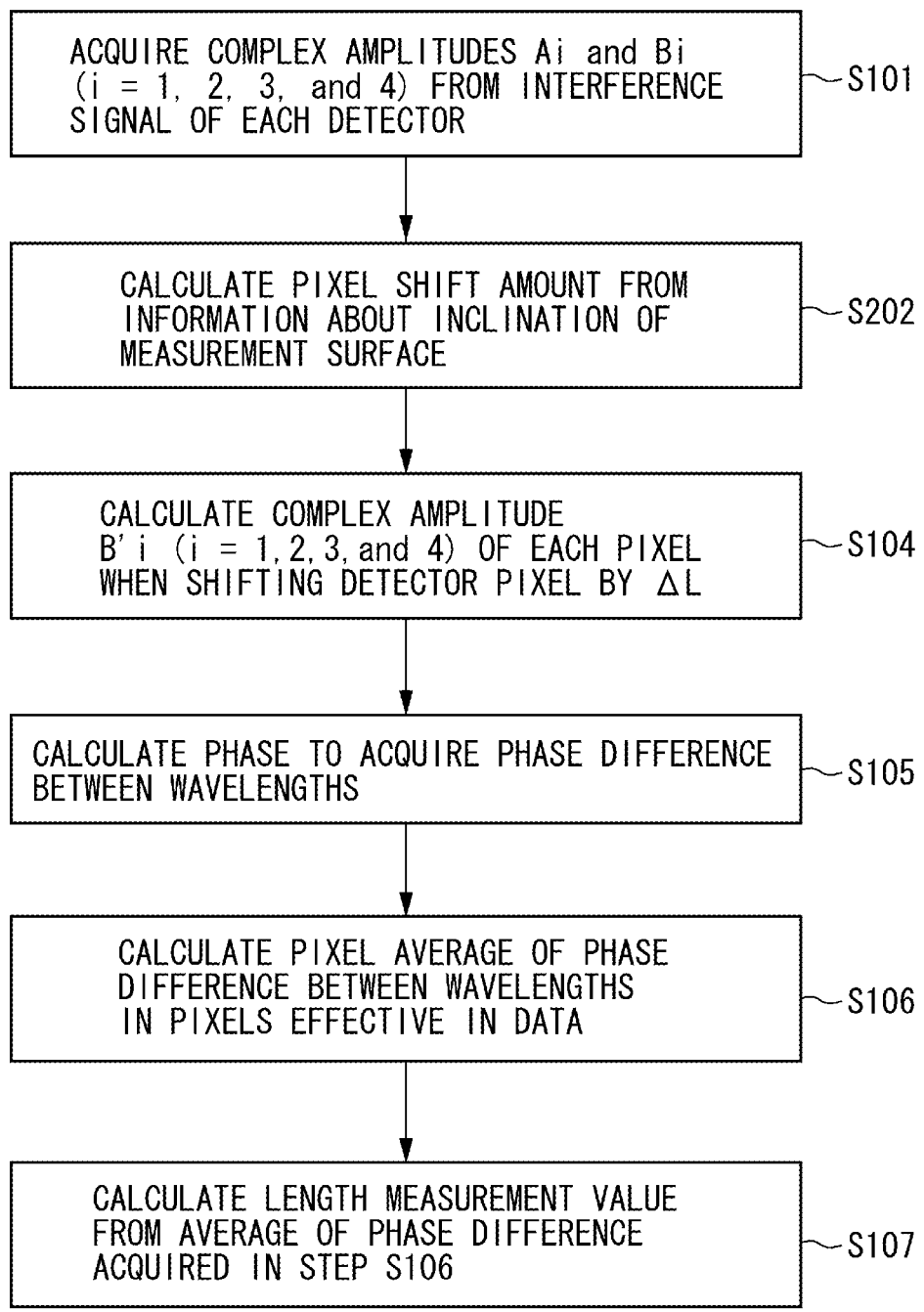
FIG. 8 illustrates a flow chart for calculating a length measurement value according to the second exemplary embodiment.

FIG. 8 illustrates a flow chart for calculating a length measurement value according to a second exemplary embodiment. The measurement apparatus of the second exemplary embodiment is similar in configuration to that of the first exemplary embodiment.

In the flow chart for calculating a phase difference in the first exemplary embodiment (FIG. 4), a pixel shift at which correlation is maximized is calculated from the complex amplitude of each wavelength. On the other hand, in the flow chart for calculating a phase difference in the present exemplary embodiment, a pixel shift amount is acquired from previously acquired information about the inclination of the measurement surface. Information about the inclination of the measurement surface can be acquired from information about the drawings of a measurement object and the orientation at which the measurement surface is arranged, for example. Information about the inclination of the measurement surface may be acquired using another measurement apparatus. The previously acquired information about the inclination of the measurement surface is stored in the calculation device 23.

A flow chart for calculating a length measurement value according to the present exemplary embodiment is described below. As is the case with the first exemplary embodiment, in step S101, the calculation device 23 acquires information about complex amplitude from interference signals detected by the detectors 222a to 225a and the detectors 222b to 225b (detection unit). In step S202, the calculation device 23 calculates a pixel shift amount nix from information about the inclination of the measurement surface stored in the calculation device 23. More specifically, the pixel shift amount nix is calculated by the following equation (4).

$$\Delta L_x = 2f \times \tan(\theta) \times \left(\frac{\lambda_1}{\lambda_2} - 1\right) \quad (4)$$

where, f is the focal length of a light-receiving optical system (an optical system from the measurement surface to a pupil conjugate position) for receiving light reflected from the measurement surface, and θ is information about the inclination of the measurement surface.

In step S202, the calculation device 23 calculates the pixel shift amount nix and then calculates the phase difference between the wavelengths to acquire a length measurement value at the same processes as those in steps S104 to S107 for the phase difference calculation flow in the first exemplary embodiment. As is the case with the first exemplary embodiment, in the present exemplary embodiment, if the measurement surface inclines in any direction, the calculation device 23 separates the light flux in a matrix form or two-dimensionally in the vicinity of the position of a pupil conjugate plane of the measurement surface. In this case, the pixel shift amount nix in the X direction and the pixel shift amount ΔLy in the Y direction are calculated by equations (5).

$$\Delta L_x = 2f \times \tan(\theta_x) \times \left(\frac{\lambda_1}{\lambda_2} - 1\right) \quad (5)$$
$$\Delta L_y = 2f \times \tan(\theta_y) \times \left(\frac{\lambda_1}{\lambda_2} - 1\right)$$

where, f is the focal length of a light-receiving optical system for receiving light reflected from the measurement surface, θx is information about the inclination of the measurement surface in the X direction, and θy is information about the inclination of the measurement surface in the Y direction. The pixel shift also needs to be two-dimensionally processed based on the pixel shift amount ΔLx and the pixel shift amount ΔLy.

In the above-described exemplary embodiments, the heterodyne interferometer is described. However, the exemplary embodiments can also be applied to a case where a rough surface is measured by a multi-wavelength homodyne interferometer. For the case of a multi-wavelength homodyne interferometer, also, the complex amplitude or the phase of each wavelength is acquired by dividing the light flux of the interference signal on the pupil conjugate plane of the measurement surface to allow the application of the above-described phase difference calculation flow. In this case, an inclined and rough measurement surface can be measured at a high speed and accuracy even by the multi-wavelength homodyne interferometer.

In the above-described exemplary embodiments, a two-wavelength interferometer is limitedly described. However, a different multi-wavelength interferometer with three wavelengths or more may be used, for example. Alternatively, the exemplary embodiments can be applied to a multi-wavelength scanning interferometer allowing absolute length measurement by scanning one of a plurality of wavelengths.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-233345 filed Oct. 24, 2011, which is hereby incorporated by reference herein in its entirety.

What is claimed is:

1. A multi-wavelength interferometer using at least two light fluxes each having a different wavelength, the multi-wavelength interferometer comprising:
   a beam splitter configured to split the light fluxes into a reference beam and a measurement beam;
   a frequency shifter configured to shift a frequency of the reference beam or a frequency of the measurement beam or to shift the frequencies of the reference beam and the measurement beam to make the frequencies of the reference beam and the measurement beam different from each other;
   an optical system configured to cause the measurement beam to be incident on a measurement surface and to cause the measurement beam reflected from the measurement surface to interfere with the reference beam to obtain interference light, the frequencies of the reference beam and the measurement beam being different from each other by the frequency shifter;
   a wavefront dividing unit configured to divide a wavefront of the interference light into wavefronts of a plurality of light beams; and
   a detection unit configured to detect the plurality of light beams divided by the wavefront dividing unit for each wavelength.

2. The multi-wavelength interferometer according to claim 1, further comprising a processing unit configured to acquire a complex amplitude from a signal of the interference light detected by the detection unit, to acquire a complex correlation of the complex amplitude for each wavelength in each of the plurality of light fluxes, to acquire a pupil position for calculating a phase according to the complex correlation for each wavelength, and to acquire a difference in phase between wavelengths from information about the phase in the acquired pupil position for each wavelength.

3. The multi-wavelength interferometer according to claim 1, further comprising a processing unit configured to acquire information about inclination of the measurement surface, to acquire a pupil position for calculating a phase for each wavelength from the information about inclination, and to acquire a difference in phase between wavelengths from information about phase in the acquired pupil position for each wavelength.

4. The multi-wavelength interferometer according to claim 1, wherein the wavefront dividing unit is movable.

5. The multi-wavelength interferometer according to claim 1, wherein the wavefront dividing unit is a microlens array.

6. The multi-wavelength interferometer according to claim 1, wherein the wavefront dividing unit is located on a pupil conjugate plane with respect to the measurement surface.

* * * * *